(12) United States Patent
Gillette et al.

(10) Patent No.: US 10,823,440 B2
(45) Date of Patent: Nov. 3, 2020

(54) SYSTEMS AND METHODS FOR INTERACTIVE HVAC MAINTENANCE INTERFACE

(71) Applicant: Johnson Controls Technology Company, Plymouth, MI (US)

(72) Inventors: Theresa N. Gillette, Wichita, KS (US); Jedidiah O. Bentz, Wichita, KS (US); Shaun B. Atchison, Wichita, KS (US); John W. Uerkvitz, Valley Center, KS (US); Brian D. Rigg, Douglass, KS (US); Shawn A. Hern, Park City, KS (US); Tom R. Tasker, Andover, KS (US); Tyler McCune, El Dorado, KS (US); Aneek Muhammad Noor, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 130 days.

(21) Appl. No.: 15/630,644

(22) Filed: Jun. 22, 2017

(65) Prior Publication Data

US 2018/0031256 A1   Feb. 1, 2018

Related U.S. Application Data

(60) Provisional application No. 62/421,201, filed on Nov. 11, 2016, provisional application No. 62/367,597, filed on Jul. 27, 2016.

(51) Int. Cl.
*F24F 11/30* (2018.01)
*F24F 11/38* (2018.01)
(Continued)

(52) U.S. Cl.
CPC .............. *F24F 11/30* (2018.01); *F24F 11/38* (2018.01); *F24F 11/32* (2018.01); *F24F 2110/00* (2018.01); *G06Q 10/20* (2013.01)

(58) Field of Classification Search
USPC ........... 165/207; 707/802; 345/633; 702/186
See application file for complete search history.

(56) References Cited

U.S. PATENT DOCUMENTS

7,383,158 B2   6/2008   Krocker et al.
8,550,368 B2 * 10/2013   Butler .................... F25B 49/02
                                                      236/1 E
(Continued)

*Primary Examiner* — Mohammad Ali
*Assistant Examiner* — Sheela Rao
(74) *Attorney, Agent, or Firm* — Foley & Lardner LLP (57) ABSTRACT

A control system for an HVAC system. The control system includes a user interface configured to present information to a user and receive inputs from the user. A processor is configured to cause the processor to receive one or more system parameters associated with HVAC system components. The processor is further configured to determine if a maintenance operation is required in response to receiving the one or more system parameters, and to display to the user via the user interface an indication that a maintenance operation is required. The processor is also configured to receive an instruction from the user to initiate the maintenance operation, and to display one or more operational conditions required to be satisfied prior to the maintenance operations being performed. The HVAC components are monitored to determine if the operational conditions are completed, and maintenance instructions are displayed in response to the operational conditions being completed.

25 Claims, 6 Drawing Sheets

(51) Int. Cl.
　　　*G06Q 10/00*　　　　(2012.01)
　　　*F24F 11/32*　　　　(2018.01)
　　　*F24F 110/00*　　　(2018.01)

(56) References Cited

U.S. PATENT DOCUMENTS

| | | | |
|---|---|---|---|
| 8,830,267 B2 * | 9/2014 | Brackney | G06Q 10/06 |
| | | | 345/633 |
| 9,285,802 B2 | 3/2016 | Arensmeier | |
| 2004/0154319 A1 * | 8/2004 | Jayanth | B25J 9/1687 |
| | | | 62/129 |
| 2012/0179727 A1 | 7/2012 | Esser | |
| 2014/0034284 A1 | 2/2014 | Butler et al. | |
| 2016/0121251 A1 * | 5/2016 | Baek | F24F 3/1603 |
| | | | 95/25 |
| 2016/0180347 A1 * | 6/2016 | Greene | G06Q 10/20 |
| | | | 705/304 |
| 2017/0018007 A1 * | 1/2017 | DeFrank | G06Q 30/0262 |
| 2017/0238153 A1 * | 8/2017 | Daoud | H04W 4/33 |
| | | | 455/466 |
| 2018/0139069 A1 * | 5/2018 | Rawlins | H04L 12/282 |

* cited by examiner

SYSTEMS AND METHODS FOR INTERACTIVE HVAC MAINTENANCE INTERFACE

CROSS-REFERENCE TO RELATED PATENT APPLICATION

This application claims priority from U.S. Provisional Application No. 62/367,597, filed Jul. 27, 2016, and U.S. Provisional Application No. 62/421,201, filed Nov. 11, 2016, both of which are incorporated herein by reference in their entirety.

BACKGROUND

The present disclosure relates generally to systems and methods for providing improved maintenance capability to a residential HVAC system.

Typically, when a homeowner experiences an issue or fault with their Heating Ventilating and Air Conditioning (HVAC) system, the homeowner would be required to either call a technician or attempt to correct the issue themselves, such as by consulting the operating manual. However, a homeowner may have trouble diagnosing the source of the problem, determining if additional parts are required, and performing the actual maintenance. Further, if the homeowner does not properly follow the instructions properly, additional damage to the HVAC system may occur. Additionally, a technician may be costly, and may take some time to arrive and fix the issue due to the schedule of the technician. Thus, a system and method for providing interactive maintenance instructions to a homeowner can serve to increase the ability of a homeowner to diagnose and correct issues in their HVAC system.

SUMMARY

One embodiment of the present disclosure related to a control system for a heating, ventilating and air conditioning (HVAC) system. The control system includes a user interface configured to present information to a user and receive inputs from the user. The control system further includes a controller for controlling one or more HVAC system components. The controller is in communication with the user interface. The control system further includes a processing circuit. The processing circuit includes a processor and a memory. The memory stores instructions that are executable by the processor to cause the processor to receive one or more system parameters associated with the one or more HVAC system components. The processor is further configured to determine if a maintenance operation is required in response to receiving the one or more system parameters, and to display to the user via the user interface an indication that a maintenance operation is required. The processor is also configured to receive an instruction from the user to initiate the maintenance operation, and to display one or more operational conditions to the user. The operational conditions are required to be satisfied prior to the maintenance operations being performed. The processor is also configured to monitor the HVAC components to determine if the operational conditions are completed, and to display maintenance instructions to the user in response to the operational conditions being completed.

Another embodiment relates to a computer implemented method for providing maintenance instructions for a heating, ventilating and air conditioning (HVAC) system. The method includes receiving an indication that maintenance is required at a maintenance service. The method also includes displaying an indication to a user via a user interface that one or more maintenance operations are required and evaluating one or more system parameters at the maintenance service to determine what maintenance operations are required. The method also includes determining one or more operational conditions associated with the required maintenance operation, and displaying one or more maintenance instructions to the user on the user interface in response to the operational conditions being satisfied.

Another embodiment relates to a control system for a heating, ventilating, and air conditioning (HVAC) system. The control system includes a user interface configured to present information to a user and receive inputs from the user. The user interface is in communication with a digital imaging device. The control system further includes a controller for controlling one or more HVAC system components and in communication with the user interface. The control system further includes a processing circuit. The processing circuit includes a processor and a memory. The memory is configured to store instructions that are executable by the processor to cause the processor to receive one or more system parameters associated with the one or more HVAC system components. The processor is further configured to determine if a maintenance operation is required in response to receiving the one or more system parameters, and to display to the user using the user interface, an indication that a maintenance operation is required. The processor is further configured to display one or more operational conditions to the user, wherein the operational conditions are required to be satisfied prior to the maintenance operations being performed. The processor is further configured to monitor the HVAC components to determine if the operational conditions are completed. The processor is also configured to image the one or more HVAC system components using the digital imaging device, and display the image using the user interface. The processor is further configured to display one or more maintenance instructions on the user interface, wherein the maintenance instructions are overlaid onto the image of the HVAC system components.

DETAILED DESCRIPTION

Overview

Referring generally to the figures, an interactive maintenance system for HVAC systems is shown, according to various example embodiments. The HVAC control system described herein may be used in any HVAC system, room, environment, or system within which it is desired to maintain and repair the HVAC system.

The control system described herein is intended to improve the methodologies through which traditional HVAC systems are maintained and repaired. Traditionally, a homeowner would be required to contact a technician when there is an issue with their HVAC system. This results in additional costs to the homeowner, and often a delay in resolving the issue based on the schedule of the technician. Further, while a homeowner may be able to perform some level of maintenance and repair using a user guide or other documentation, this can be confusing, and does not help the homeowner in diagnosing the problem. Further, homeowners may also forget or delay performing preventative maintenance on their HVAC system, which can lead to faults or failures of components, requiring costly repairs.

The HVAC maintenance interface system disclosed herein is intended to solve such shortcomings by providing an interactive interface to a homeowner, allowing them to both diagnose and correct certain issues. Specifically, the interface system may either receive an indication of an issue with the HVAC system from the homeowner, or via internal diagnostic programs. The interface system may then provide step by step instructions to the homeowner instructing the homeowner how to maintain the HVAC system. The interface system may further communicate with the HVAC system, such as via the HVAC controller, to ensure that specific steps have been followed to prevent potential damage to the HVAC system. The interface system may also alert the homeowner to perform certain preventative maintenance tasks based on various system parameters.

HVAC System and Thermostat

Figure 1:
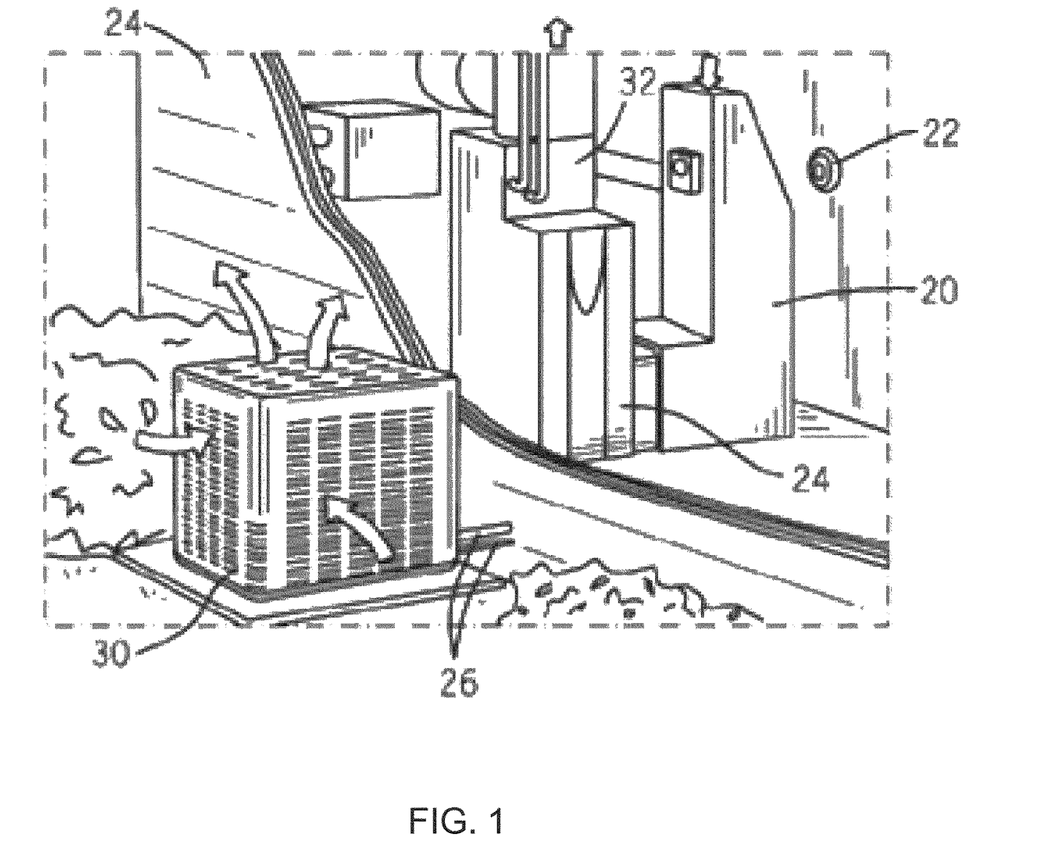
FIG. 1 is an illustration of a residential HVAC system that employs heat exchangers, according to some embodiments.

FIG. 1 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 will include refrigerant conduits 26 that operatively couple an indoor unit 28 to an outdoor unit 30. Indoor unit 28 may be positioned in a utility space, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 1 is operating as an air conditioner, a coil in outdoor unit 30 serves as a condenser for recondensing vaporized refrigerant flowing from indoor unit 28 to outdoor unit 30 via one of the refrigerant conduits 26. In these applications, coil 32 of the indoor unit serves as an evaporator coil. The coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan (not shown), and expels the air as indicated by the arrows above the outdoor unit. When operating as an air conditioner, the air is heated by the condenser coil within the outdoor unit and exits the top of the unit at a temperature higher than it entered the sides. Air is blown over indoor coil 32 and is then circulated through residence 24 by means of ductwork 20, as indicated by the arrows entering and exiting ductwork 20. The overall system operates to maintain a desired temperature as set by system controller 22. When the temperature sensed inside the residence is higher than the set point on the thermostat (with the addition of a relatively small tolerance), the air conditioner will become operative to refrigerate additional air for circulation through the residence. When the temperature reaches the set point (with the removal of a relatively small tolerance), the unit will stop the refrigeration cycle temporarily.

When the unit in FIG. 1 operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 32 will receive a stream of air blown over it and will heat the air by condensing a refrigerant.

The system controller 22 (e.g., a thermostat) may provide control signals to control circuits (not shown) configured to control the operation of the indoor and outdoor units 46 and 48. The control circuits may execute hardware or software control algorithms to regulate the HVAC system. In some embodiments, the control circuits may include one or more microprocessors, analog to digital converters, non-volatile memories, and interface boards. For example, in response to receiving signals from the system controller 22, the control circuits may control operations of fans and refrigerant flow control valves of the indoor and outdoor units 46 and 48 to cause more or less warm or cool air to be provided to a building space so as to change the temperature in the building space.

In accordance with the systems and methods disclosed herein, the system controller 22 is configured to generate sensor signals to be provided to the control circuits based on sensor signals received from various sensors (e.g., temperature sensors and humidity sensors measuring conditions both inside of and outside of a building space), and external server computing systems (e.g., associated with a weather service or a utility company).

The system controller 22 may also control the ventilation to the building. For example, the control device may control various actuators associated with various dampers in the outdoor unit 30 to control the rates at which inside air is expelled to the exterior of the building or outside air is directed to the interior of the building. Additionally, the system controller 22 may control the ventilator or amount of air introduced into various zones (e.g., rooms) of the building by controlling various dampers associated with an air supply duct.

HVAC Control System Providing Interactive Maintenance Instructions

Figure 2A:
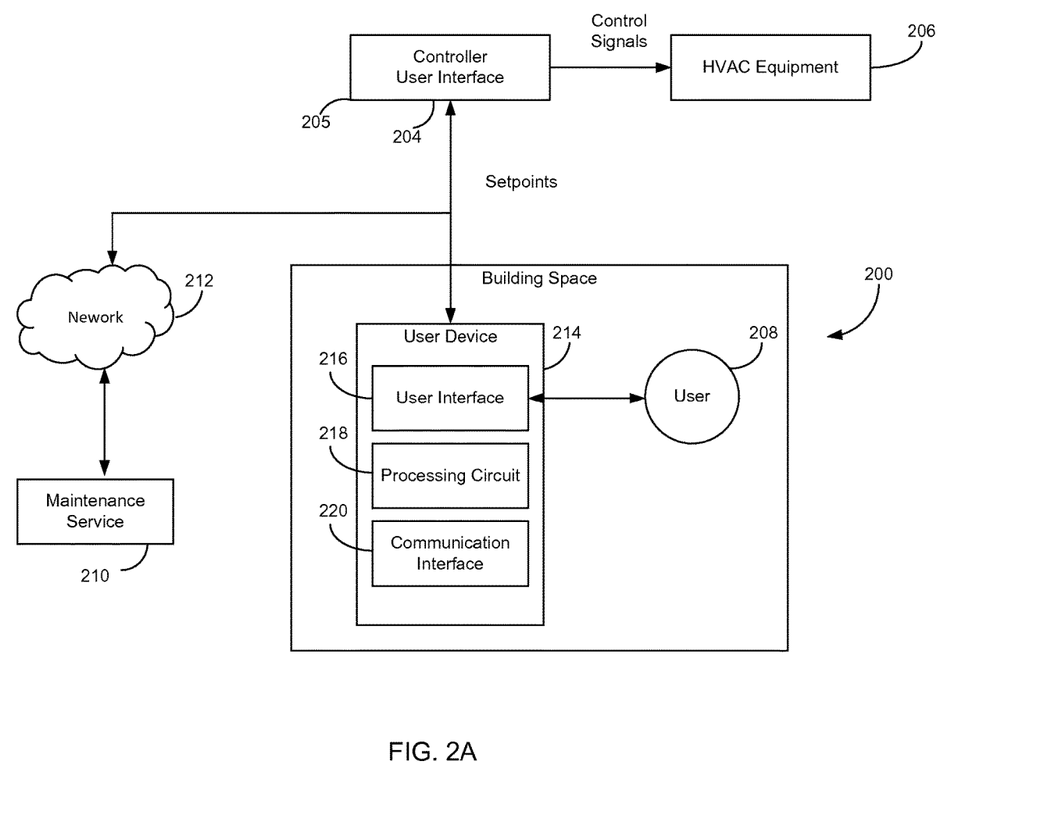
FIG. 2A is a block diagram of a system for controlling the HVAC equipment associated with a building space, according to some embodiments.

Referring now to FIG. 2A, a system 200 for monitoring and controlling HVAC equipment within a building space 202 is shown, according to an example embodiment. System 200 is shown to include a controller 204 for controlling HVAC equipment 206, which services the building space 202. In the example shown, the building space 202 includes a single controller 204. In one embodiment, the controller is a thermostat. In some embodiments, the controller 204 may include a user interface 205. The user interface 205 includes an electronic display for presenting information to a user 208 and one or more physical input devices (e.g., a rotary knob, pushbuttons, manually-operable switches, etc.) for receiving inputs from the user 208.

In various embodiments, the controller 204 may be integrated with a thermostat or may exist as a separate controller (e.g., a field and equipment controller, a supervisory controller, etc.) that receives input from a thermostat. The thermostat may send temperature measurements and temperature setpoints to the controller 204. In turn, the controller 204 generates control signals for HVAC equipment 206. In an example embodiment, the HVAC equipment 206 includes the HVAC system discussed above in relation to FIG. 1.

In some embodiments, the controller 204 is configured to communicate with a maintenance service 210 over a network 212. The network 212 may include local area networks or wide area networks (e.g., the Internet, a building WAN, etc.). In one example, the maintenance service 210 may be associated with an external service provider providing maintenance information for one or more various types of HVAC equipment 206. The maintenance service 210 may serve as a central repository of maintenance data for various HVAC components. The maintenance service 210 may further include a database with system configuration for various building spaces. For example, the maintenance service 210 may have a system configuration stored for the building space 202. In some embodiments, a technician or installer may provide the information to the maintenance service 210 when the HVAC system is installed into the building space 202. For example, a job number, or other identifying number, may be associated with the building space 202, and may include all of the HVAC components installed in the building space 202. Further, other parameters such as connection types, equipment location, control parameters, system layout, and the like may be stored in the maintenance service 210. The maintenance service 210 may further have access to various technical data associated with various HVAC equipment. Example technical data can include technical specifications, connection diagrams, troubleshooting or maintenance guides, and the like. In one embodiment, the maintenance service 210 is a subscription based service that the user 208 may subscribe to in order to have access to the maintenance services provided by the maintenance service 210. In one example, the user 208 may subscribe to the maintenance service 210 during an initial installation of the system 200.

In some embodiments, the maintenance service 210 may be able to communicate directly with the controller 204. For example, the maintenance service 210 may be able to query the controller 204 to obtain current data associated with one or more pieces of HVAC equipment 206. Example data may include setpoints, voltages, currents, temperatures, pressures, etc. The maintenance service 210 may also be able to query the controller 204 to provide any faults or other messages generated by the controller 204 or other HVAC equipment 206. The maintenance service 210 may use this information to further generate maintenance information, as well as to store for future reference.

The system 200 further includes a user device 214. The user device 214 is shown to include a user interface 216, a processing circuit 218, and a communication interface 220. The user device 214 may be a computing device utilized by the user 208. In one embodiment, the user device 214 is a mobile device, such as a smartphone (Apple® iPhone®, Android® Phone, Microsoft® Windows Phone®), a tablet computer (Apple® iPad®, Android® Tablet, Microsoft® Surface®), a laptop or desktop computer, a wearable computing device, or any other electronic device capable of communicating with the controller 204 and/or the network 212. In some embodiments, the user device 214 may be a dedicated interface device associated with the system 200. The user device 214 may be configured to interface with the controller 204 either directly or via the network 212. Similarly, the user device 214 may be configured to interface with the maintenance service 210 via the network 212. In some embodiment, the user device 214 is a dedicated device for interfacing with the system 200.

Figure 2B:
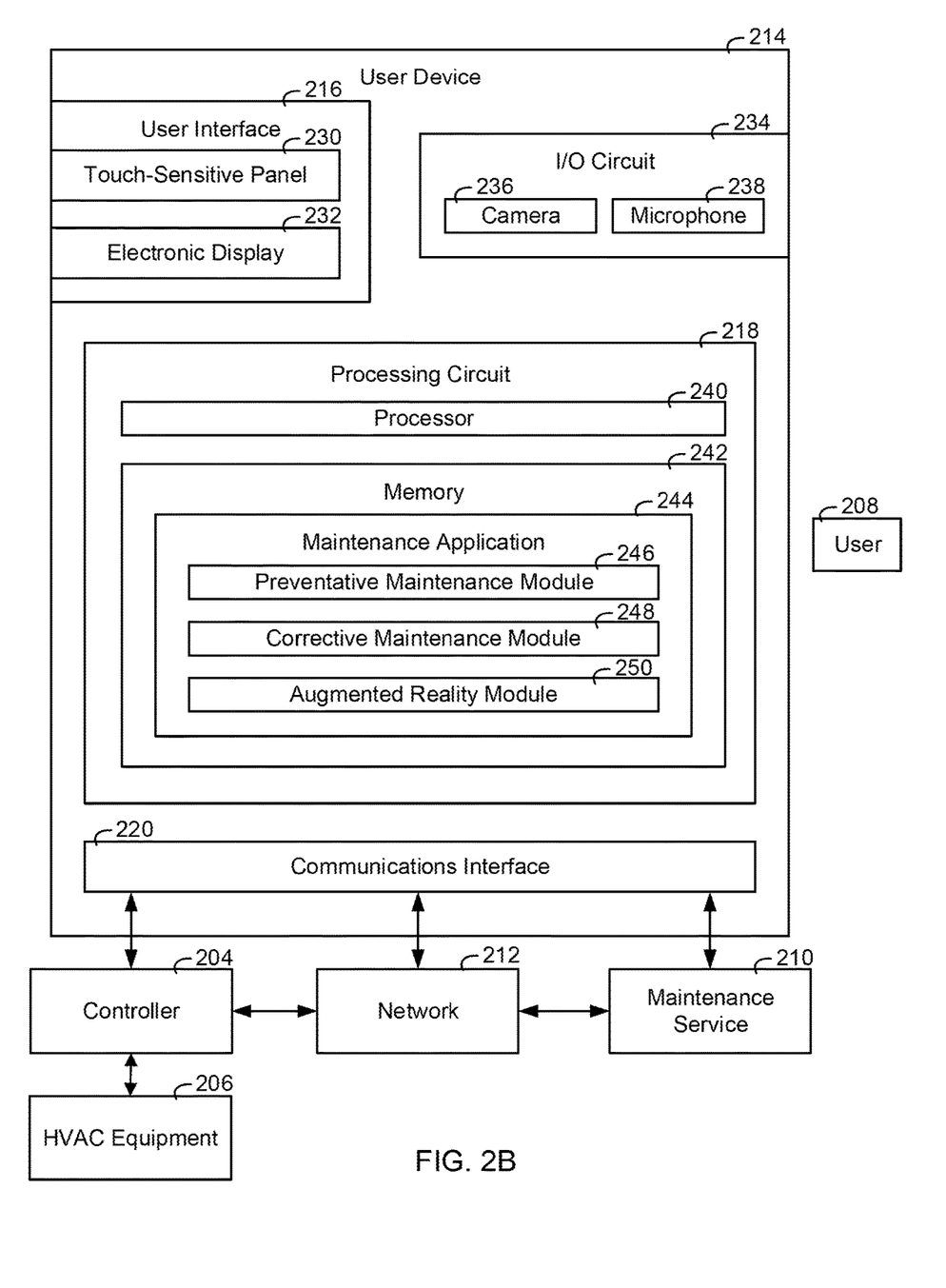
FIG. 2B is a block diagram of a user device of the system of FIG. 2A, according to some embodiments.

Referring now to FIG. 2B a block diagram illustrating the user device 214 is shown, according to some embodiments. The user device 214, as described above, may have a user interface 216. The user interface 216 may include a touch sensitive panel 230 and an electronic display 232. It is contemplated that the user device 214 may include any type of device configured to receive input from a user and/or provide an output to a user in any of a variety of forms (e.g., touch, text, video, graphics, audio, vibration, etc.). Similarly, the electronic display 232 can display information to a user 208.

The user device 214 is further shown to include an input-output (I/O) circuit 234. The I/O circuit 234 may allow for inputs and outputs, other than those available on the user interface 216. The I/O circuit 234 is shown to include a camera 236 and a microphone 238. The camera 236 may be used to provide a still or moving picture that can be viewed on the user interface 216. For example, the camera 236 may be used to capture an image of HVAC equipment 206, which can then be transmitted to the maintenance service 210 for analysis. In one embodiment, the camera 236 is a digital imaging device. The microphone 238 can be configured to record audio related to the HVAC equipment 206. For example, the microphone 238 may be used to capture audio produced by the HVAC equipment 206, which can then be transmitted to the maintenance service 210 for analysis.

The processing circuit 218 of the user device 214 may include a processor 240 and a memory 242. Processor 240 may be a general purpose or specific purpose processor, an application specific integrated circuit (ASIC), one or more field programmable gate arrays (FPGAs), a group of processing components, or other suitable processing components. Processor 240 may be configured to execute computer code or instructions stored in memory 242 or received from other computer readable media (e.g., CDROM, network storage, a remote server, etc.).

Memory 242 may include one or more devices (e.g., memory units, memory devices, storage devices, etc.) for storing data and/or computer code for completing and/or facilitating the various processes described in the present disclosure. Memory 242 may include random access memory (RAM), read-only memory (ROM), hard drive storage, temporary storage, non-volatile memory, flash memory, optical memory, or any other suitable memory for storing software objects and/or computer instructions. Memory 242 may include database components, object code components, script components, or any other type of information structure for supporting the various activities and information structures described in the present disclosure. Memory 242 may be communicably connected to processor 240 via processing circuit 218 and may include computer code for executing (e.g., by processor 240) one or more processes described herein. For example, memory 242 is shown to include a maintenance application 244. The maintenance application 244 may further include a preventative maintenance module 246, a corrective maintenance module 248, and an augmented reality module 250. In the example shown, the maintenance application 244 is executed at the user device 214. However, it should be understood that such applications and modules may be executed remotely from the user device 214 (e.g., at the controller 204, the maintenance service 210) in accordance with the present disclosure.

Still referring to FIG. 2B, user device 214 is shown to include the communications interface 220. The communications interface 220 may include wired and/or wireless interfaces (e.g., jacks, antennas, transmitters, receivers, transceivers, wire terminals, etc.) for conducting data communications with various systems, devices, or networks. For example, the communications interface 220 may include an Ethernet card and port for sending and receiving data via an Ethernet-based communications network and/or a Wi-Fi transceiver for communicating via a wireless communications network. Communications interface 220 may be configured to communicate via local area networks or wide area networks (e.g., the Internet, a building WAN, etc.) and may use a variety of communications protocols (e.g., BACnet, IP, LON, etc.). Communications interface 220 may include a network interface configured to facilitate electronic data communications between the user device 214 and various external systems or devices (e.g., the controller 204, the maintenance service 210, and the network 212).

As described above, the maintenance application 244 may include the preventative maintenance module 246, the corrective maintenance module 248 and the augmented reality (AR) module 250. In one embodiment, one or more of the preventative maintenance module 246, the corrective maintenance module 248 and the AR module 250 may be implemented on the maintenance service 210. The preventative maintenance module 246 is structured to cause the processor 240 to execute a preventative maintenance program. The preventative maintenance module 246 may be configured to automatically instruct the user 208 to perform certain preventative maintenance on the HVAC equipment 206. In one embodiment, the preventative maintenance module 246 provides preventative maintenance operations to the user 208 based on a request from the user 208, such as via the user interface 216. In some embodiments, the preventative maintenance module 246 may be configured to automatically provide preventative maintenance operations to the user 208 based on one or more determined operational values of the HVAC equipment 206.

In one embodiment, the controller 204 may communicate operational values of the HVAC equipment 206 directly to the maintenance application 244. In other embodiment, the controller 204 may communicate the operational values of the HVAC equipment 206 to the maintenance service 210 via the network 212. The maintenance application 244 may then access the operation values stored in the maintenance service 210, such as via communication interface 220. The operational values may include run-time, time since last preventative maintenance, system temperatures, system pressures, system voltages, system currents, time of year, etc. The preventative maintenance module 246 may process the operational values to determine what, if any preventative maintenance is required or suggested. In some embodiments, the maintenance service 210 may process the operational values, and provide suggested preventative maintenance operations to the preventative maintenance module 246.

Figure 3A:
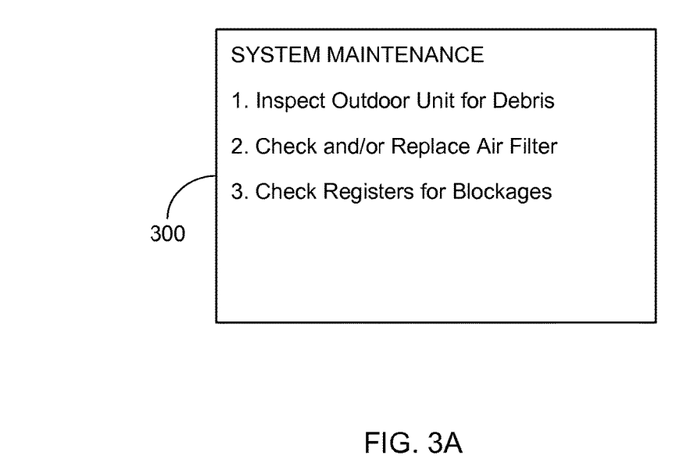
FIG. 3A is a user interface display providing preventative maintenance operations, according to some embodiments.

The preventative maintenance module 246 may provide a visual indication of the suggested preventative maintenance to the user 208 via the user interface 216. For example, FIG. 3AF provides an example screen shot 300 providing preventative maintenance operations to the user 208. In one embodiment, the preventative maintenance operations are displayed via the user interface 216. The preventive maintenance operations may include a series of instructions 302 that are presented to the user 208. For example, preventative maintenance operations may include: inspecting an outdoor unit, such as outdoor unit 30, for possible debris; checking and/or replacing an air filter in an indoor unit, such as indoor unit 28, and/or checking one or more air registers for blockages.

Returning now to FIG. 2B, the preventative maintenance module 246 may be further configured to provide specific guidance to the user 208 on how to perform the preventative maintenance. For example, the preventative maintenance module 246 may access system configurations and layouts that are stored in the maintenance service 210. For example, where the maintenance is replacing an air filter, the preventative maintenance module 246 may be configured to visually indicate on the user interface 216 where the filter is located, and provide step by step instructions on how to remove the old air filter and install the new one. Further, the preventative maintenance module 246 may be configured to assist the user 208 in selecting a new air filter. For example, the preventative maintenance module 246 may access the camera 236 of the user device 214, and instruct the user 208 to capture one or more images of the existing air filter. The preventative maintenance module 246 may then suggest a different type of air filter be used, or that the current type be used. Further, the preventative maintenance module 246 may further provide information regarding where to purchase the new air filter, and, in some embodiments, display one or more digital stores via the user interface 216 to allow the user 208 to order the new filter directly from the user device 214.

In still further embodiments, the preventative maintenance module 246 may be configured to perform various system 200 checks before providing certain preventative maintenance operational steps to the user 208. For example, some preventative maintenance operations may require power to be removed from the HVAC equipment 206. The preventative maintenance module 246 may instruct the user 208 to remove power via the user interface 216. The preventative maintenance module 246 may then wait until it receives confirmation that the power has been removed before presenting the next operational step to the user 208. In some embodiments, the preventative maintenance module 246 may communicate directly to the controller 204 to verify that power has been removed to the required HVAC equipment 206. In other embodiments, the preventative maintenance module 246 may receive an indication that the power has been removed from the maintenance service 210, via the network 212. The maintenance service 210 may receive the confirmation that the power has been removed from the controller 204. While the above example described removing power as a condition to proceeding with the preventative maintenance operational steps, other conditions may also be required for other preventative maintenance operations.

The corrective maintenance module 248 is structured to cause the processor 240 to execute one or more maintenance programs. In some embodiments, the user 208 may access the corrective maintenance module 248 when the user 208 notices a problem or fault with the HVAC equipment 206. For example, if the HVAC equipment 206 is not properly heating or cooling the building space 202, the user 208 may initiate the corrective maintenance module 248 within the maintenance application 244. In some embodiments, the corrective maintenance module 248 may initiate the maintenance programs when a fault is detected by the controller 204. For example, the controller 204 may communicate a detected fault directly to the user device 214. In other embodiments, the controller 204 may communicate the fault to the maintenance service 210, which in turn can communicate the fault to the user device 214 via the network 212.

Upon receiving an indication of a fault, the corrective maintenance module 248 may request that the controller 204 perform one or more diagnostic checks on the HVAC equipment 206. For example, the controller 204 may determine if any other faults are present in the system 200. In other examples, the controller 204 may run pre-defined tests or procedures to determine if there are additional issues with the HVAC equipment 206. These tests may record one or more values associated with the HVAC equipment 206. In some embodiments, the controller 204 may process the data received from the test performance. In other embodiments, the controller 204 may send the data to the maintenance service 210 for analysis. In one embodiment, the corrective maintenance module 248 may request the user 208 to capture an image of a component of the HVAC equipment 206 using the camera 236. Additionally, the corrective maintenance module 248 may request the user 208 to capture an audio output of one or more components of the HVAC equipment 206 using the microphone 238. The image and/or audio data may be provided to the maintenance service 210 for analysis.

The corrective maintenance module 248 may be configured to communicate with controller 204 and/or the maintenance service 210 to receive an indication as to the maintenance issue, which the corrective maintenance module 248 may then provide to the user 208 via the user interface 216. In one embodiment, the maintenance service 210 and/or the controller 204 may determine what, if any, action may be taken by the user 208 to correct the detected issue. In some examples, the maintenance service 210 and/or the controller 204 may determine that the issue cannot be resolved by the user 208, and may instruct the user 208 to contact a service technician. In some embodiments, the corrective maintenance module 248 may provide an indication to the user 208 to instruct the user 208 to contact a technician, such as via the user interface 216. In further embodiments, the corrective maintenance module 248 may provide a list of technicians in the area of the user 208 that can provide the service. The corrective maintenance module 248 may further be configured to provide contact information for the technicians, or to allow the user 208 to schedule an appointment with the technician directly via the user interface 216.

Figure 3B:
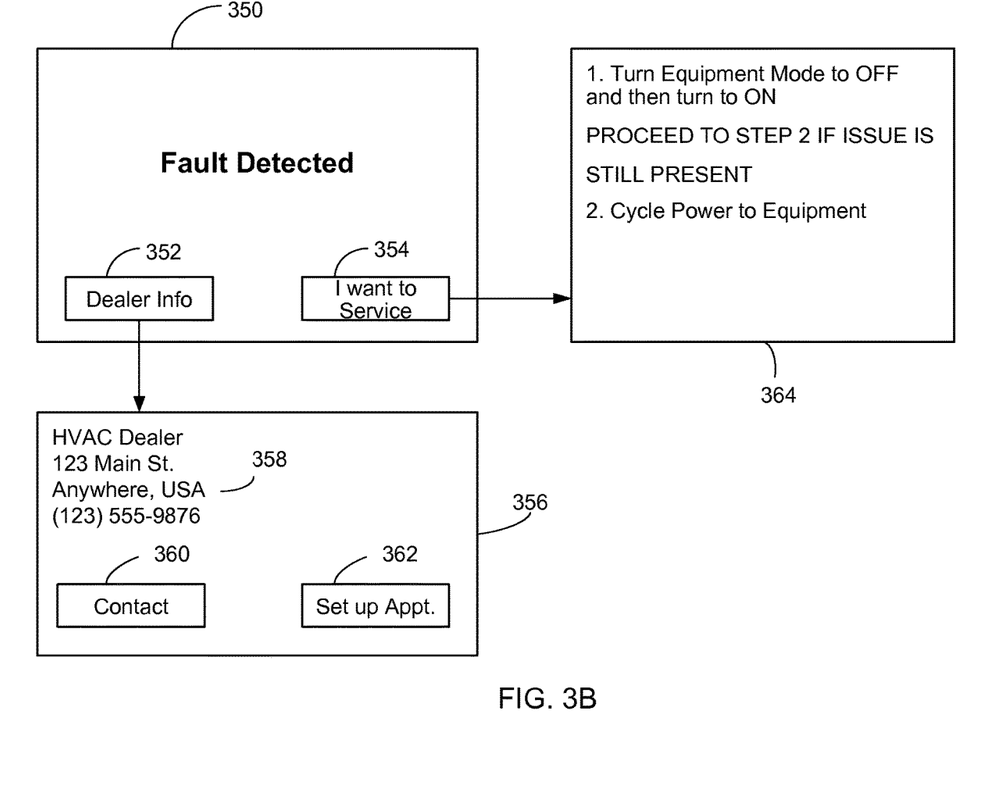
FIG. 3B is a user interface display providing corrective maintenance operations, according to some embodiments.

In some embodiments, the maintenance service 210 and/or the controller 204 may determine that there are potential actions that the user 208 may be able to perform to attempt to mitigate or repair the detected issue. Based on the outcome of the user's 208 actions, the maintenance service 210 and/or the controller 204 may further determine that a technician may be required if the actions performed by the user 208 do not resolve the issue. For example, as shown in FIG. 3B, the corrective maintenance module 248 may display, via the user interface 216, an indication that a fault was detected, as shown in fault display screen 350. The fault display screen 350 may include a dealer information input 352 and a self-service input 354. If the user 208 selects the dealer information input 352, the user interface 216 may display a dealer information screen 356. The dealer information screen 356 may include dealer information 358, a contact input 360 and an automated technician appointment request input 362. The contact input 360 may allow the user 208 to directly contact the technician via the user device 214. In one example, when the user 208 selects the contact input 360, the user interface 216 may display multiple options for contacting the technician/dealer. Example options include voice call, text message (e.g. SMS, MMS), e-mail, or directly via a website or other portal associated with the technician. If the user 208 selects the automated technician appointment request input 362, the user 208 may be presented with an interface for scheduling an appointment with the technician, via the user interface 216. The interface may be a remote interface associated with a website or other portal associated with the technician. In other examples, the interface may be a local interface provided by the corrective maintenance module 248. The maintenance module may communicate with one or more technicians via the maintenance service 210, and provide the available times and dates directly to the user 208, via the user interface. The user 208 may then schedule the appointment with the technician.

If the user 208 selects the self-service input 354, the corrective maintenance module 248 may provide instructions to the user 208 for possible maintenance activities via a self-service screen 364. The self-service screen 416 may provide step by step instructions to the user 208 for correcting the detected issue. For example, as shown in FIG. 3B, the self-service screen 364 may first instruct the user 208 to "Turn Equipment Mode to OFF and Then Turn to ON." The user 208 may then further be instructed to "Cycle Power to HVAC Equipment," if the first step did not correct the issue.

Returning now to FIG. 2B, the corrective maintenance module 248 may be further configured to provide interactive instructions to the user 208. In one embodiment, where the user 208 selects to perform the maintenance, the corrective maintenance module 248 may provide interactive step-by-step instructions to the user 208 via the user interface 216. In some embodiments, the corrective maintenance module 248 may communicate with the HVAC equipment 206 when providing the interactive maintenance instructions to the user 208. The corrective maintenance module 248 may communicate with the HVAC equipment 206 using the controller 204 and/or the maintenance service 210. The corrective maintenance module 248 may communicate directly with controller 204 and/or the maintenance service 210 via the network 212.

In one example, the interactive step-by-step instructions may include conditions or interlocks that must be satisfied before the user 208 is provided with a subsequent instruction. For example, for some maintenance operations, power may be required to be removed from certain components. The corrective maintenance module 248 may communicate with the controller 204 and/or the maintenance service 210 to determine a status of one or more pieces of HVAC equipment 206. For example, the controller 204 and or the maintenance service 210 may provide an indication to the corrective maintenance module 248 that power has been removed from one or more components or HVAC equipment 206. Once the corrective maintenance module 248 establishes that power has been removed from the component or HVAC equipment 206, the corrective maintenance module 248 can provide the user 208 with subsequent instructions. Other conditions or interlocks may include valve positions, operating modes, safety switch positions, and the like. In some embodiments, the corrective maintenance module 248 may monitor the status of one or more conditions or interlocks during the maintenance process, and alert the user 208 or cease providing instructions to the user 208 when the status of the condition or interlock changes.

In some embodiments, the corrective maintenance module 248 may be configured to access various system parameters or configurations via the maintenance service 210. For example, the corrective maintenance module 248 may access one or more system configurations of the HVAC equipment 206 via the maintenance service 210 to ensure that the proper instructions are provided to the user 208. In one embodiment, the maintenance module may access system installation information to provide a location of the specific HVAC equipment 206 to be maintained. Further, based on the installation information received from the maintenance service 210, the corrective maintenance module 248 can provide access instructions to the user 208 based on the installation information. For example, where the installation information include information such as a location within the building or residence, orientation of the HVAC equipment 206, available access panels, etc., the user 208 can be provided with detailed instructions regarding accessing the HVAC equipment 206. Further, where the maintenance service 210 include images of the equipment (e.g. stock images, or actual installed device images), the corrective maintenance module 248 may be configured to provide the user 208 with the image containing one or more components of the HVAC equipment 206 that are to be examined, or modified. In some embodiments, the corrective maintenance module 248 may display the images on the electronic display 232 along with one or more annotations indicating the correct component within the HVAC equipment 206, along with the step-by-step instructions. For example, where the user 208 is instructed to operate a switch or valve, the corrective maintenance module 248 may highlight the switch or valve in an image containing the switch or valve. The corrective maintenance module 248 may further provide an indication of the required instructions related to the switch or valve in the image. For example, "turn valve handle counter-clockwise for one whole turn."

Similar to the preventative maintenance module 246, the corrective maintenance module 248 may also provide the user 208 with a list of potential tools or other equipment required to perform the maintenance, as well as a replacement parts list. In one embodiment, the corrective maintenance module 248 may present the replacement parts list to the user 208 via the user interface 216. In some embodiments, the corrective maintenance module 248 may provide a direct link to the user 208 to order the required parts. For example, the user 208 may be provided with an option to order the parts from a local authorized parts distributor.

In some embodiments, the corrective maintenance module 248, and/or the preventative maintenance module 246 may interface with the augmented reality (AR) module 250. The AR module 250 may access the camera 236 of the user device 214 to provide augmented reality services to the user 208. The images captured by the camera 236 may be displayed on the electronic display 232 of the user interface 216. In one embodiment, the AR module 250 may provide additional information in the electronic display 232 based on the image currently captured by the camera 236. For example, where the user 208 is required to actuate a valve or switch, the user 208 may be able to direct the camera 236 to a select piece of HVAC equipment 206. The AR module 250 may then indicate where the valve or switch is located on the HVAC equipment 206 within the captured image. For example, the AR module 250 may highlight a portion of the captured image associated with the valve or switch. Similarly, the AR module 250 may highlight a panel cover or other obstruction which needs to be removed to provide access to the valve or switch. The AR module 250 may further be configured to allow a user 208 to identify which piece of HVAC equipment 206 is required to be accessed. For example, the user 208 may be able to direct the camera 236 towards one or more portions of the HVAC equipment 206, and indicate on the electronic display 232 which piece of HVAC equipment 206 is associated with the desired maintenance or preventative maintenance operation.

The AR module 250 may communicate with the maintenance service 210 to access known locations of pieces of HVAC equipment 206. Further, the AR module 250 may communicate with the maintenance service 210 to collect other information such as system configurations, installations, etc. The AR module 250 may be able to access other components within the user device 214, such as gyroscopes, Global Positioning System (GPS), accelerometers, maps, etc. In one embodiment, the maintenance service 210 is used to provide the AR information to the AR module 250. However, in some examples, the AR module 250 may process the AR information via the processing circuit 218. In some embodiments, the AR module 250 may be configured to access a building or space layout, such as a building or space layout stored in the maintenance service 210. The AR module 250 may then provide a map or other geographical interface which provides the user 208 with a location of the HVAC equipment 206. In some embodiments, the AR module 250 may access a GPS application or system within the user device 214 and provide the user 208 with a location of the HVAC equipment 206 in relation to the location of the user 208.

In some embodiments, the AR module 250 may be configured to access parameters of one or more HVAC equipment 206 via the controller 204 and/or the maintenance service 210. The AR module 250 may then display parameters associated with portions of the HVAC equipment 206 on the electronic display 232 when the user 208 directs the camera 236 to the associated portions of the HVAC equipment 206. Example parameters may include temperatures, pressures, voltages, flow rates, speed, position, etc. The parameters may be displayed along with an indication of what portions of the HVAC equipment 206 they relate to. For example, a condenser coil may be highlighted by the AR module 250 on the electronic display 232, along with a pressure and temperature of the condenser coil.

Figure 4:
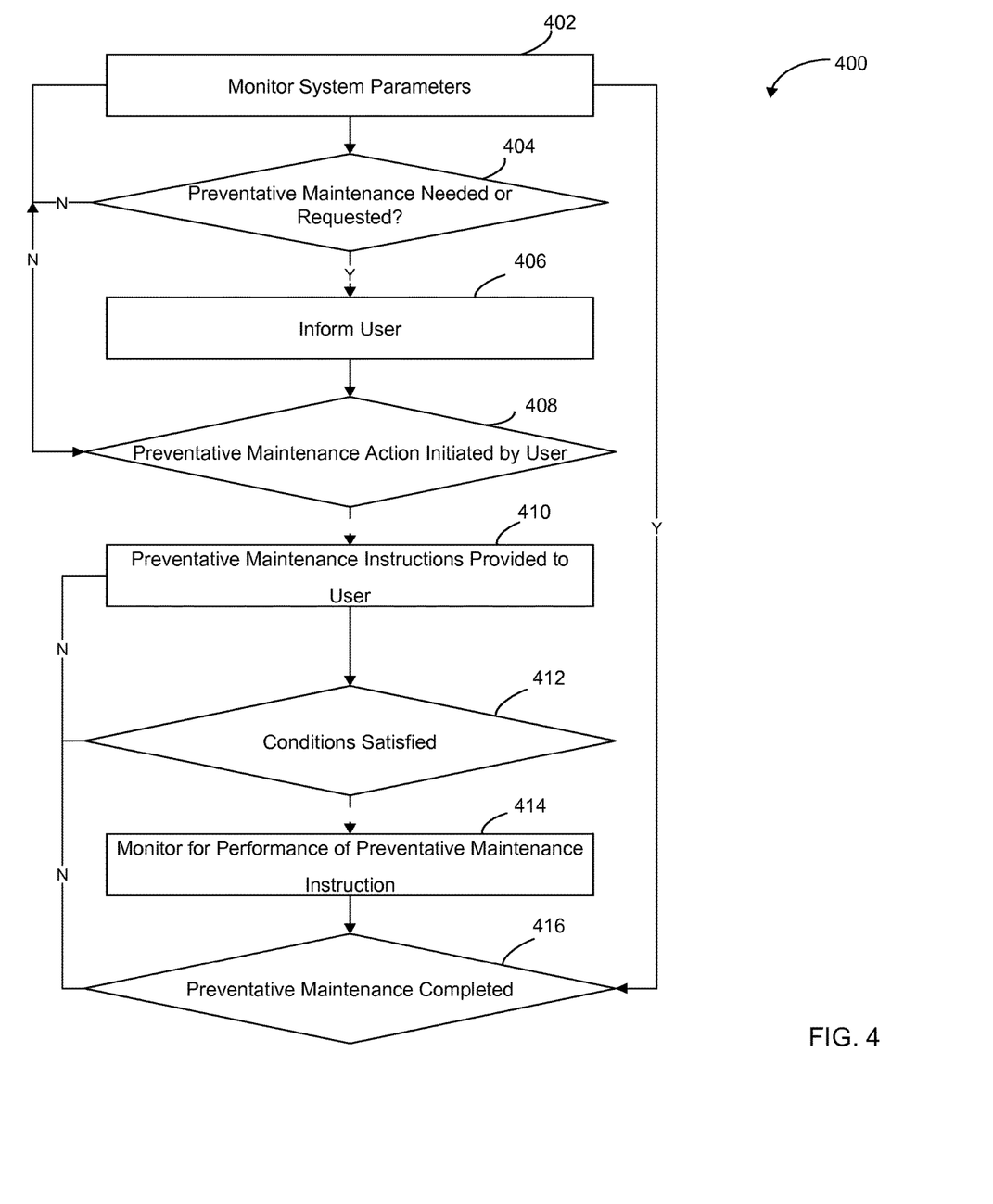
FIG. 4 is a flowchart of a process of providing preventative maintenance instructions to a user, according to some embodiments.

Referring now to FIG. 4, a process 400 for providing preventative maintenance instructions to a user is shown, according to some embodiments. The process 400 may be performed by the system 200, and specifically the preventative maintenance module 246 described in FIG. 2B, above. The process 400 may also be performed by the maintenance service 210. Further, in some embodiments, the process 400 may be performed by a combination of the maintenance service 210 and the preventative maintenance module 246. At process block 402 one or more system parameters are monitored. The parameters may be monitored by the controller 204 and communicated to the maintenance service 210. Parameters may include ambient temperatures, indoor temperatures, system temperatures, system pressures, system flows, refrigerant levels, motor speeds, valve/actuator positions, run time, time since last preventative maintenance performed, system setpoints, and the like.

At process block 404, the system 200 determines if preventative maintenance is required. In one embodiment, the system 200 may determine that preventative maintenance is required based on one or more measured parameters. In some embodiments, preventative maintenance may be determined to be required based on one or more measured parameters, such as temperature or pressures. In other embodiments, preventative maintenance may be determined to be required based on other parameters, such as time since last preventative maintenance. If preventative maintenance is not required, the system continues to monitor system parameters at process block 402.

If preventative maintenance is required, the user is informed at process block 406. In one embodiment, the maintenance service 210 may send a notification to the preventative maintenance module 246 that maintenance is required. In some embodiments, the preventative maintenance module 246 may alert the user via the user interface 216. In some embodiments, the alert may be a message presented to the user via the user interface 216, such as a text notification. In some embodiments, the maintenance service may transmit the alert to the user device 214, such as via text message or e-mail. In some examples, the alert may be a visual alert, an audio alert, or a combination thereof.

Once the user is informed, the system 200 determines if a preventative maintenance action has been initiated by the user at process block 408. In one embodiment, the user may initiate the preventative maintenance action by interfacing with the preventative maintenance module 246 via the user interface 216. The user may also defer or decline to perform the preventative maintenance action. In some embodiment, the alert sent to the user at process block 406 may include an option for the user to initiate the preventative maintenance action, to delay the action for a period of time, or to decline the preventative maintenance. If the user defers or declines the preventative maintenance at process block 408, the system 200 will continue to monitor the system parameters at process block 402. In some embodiments, if the user defers the preventative maintenance, the user may be presented with an option to delay the preventative maintenance for a period of time. Once the period of time has passed, the user may then be again informed that the preventative maintenance is required.

If the user indicates that they would like to perform the preventative maintenance, one or more preventative maintenance instructions may be provided to the user at process block 410. The preventative maintenance instructions may be provided to the user via the user interface 216. In one example, the preventative maintenance instructions may include a video tutorial provided to the user via the user interface 216. The preventative maintenance instructions may have one or more associated conditions with each of the preventative maintenance instructions, such that some instructions may not be provided to the user until the conditions have been satisfied. As described above, the conditions may include removing power from certain components or equipment, setting the system to a specific mode, system or component temperature reaching predetermined values, etc. The controller 204 may provide an indication that the specific conditions are satisfied to the maintenance service 210 and/or the preventative maintenance module 246. If the conditions are not satisfied at process block 412, the system continues to provide the preventative maintenance instructions associated with the condition to the user at process block 410. Once the conditions are satisfied at process block 412, the system 200 then monitors for the performance of the preventative maintenance instructions provided to the user at process block 414. In one embodiment, the controller 204 may monitor to determine when the preventative maintenance instructions are completed, and communicate that information to the preventative maintenance module 246 and/or the maintenance service 210. In some embodiments, the user may be able to provide an indication to the system 200 that the preventative maintenance instructions have been completed by providing an indication using the user interface 216. Once the preventative maintenance instruction is indicated as completed, the system 200 determines if the preventative maintenance is completed at process block 416. If the preventative maintenance is determined to not be completed, the process 400 returns to process block 410 to provide additional instructions to the user. If the preventative maintenance is determined to be completed, the process 400 returns to process block 402 and continues to monitor the system parameters.

Figure 5:
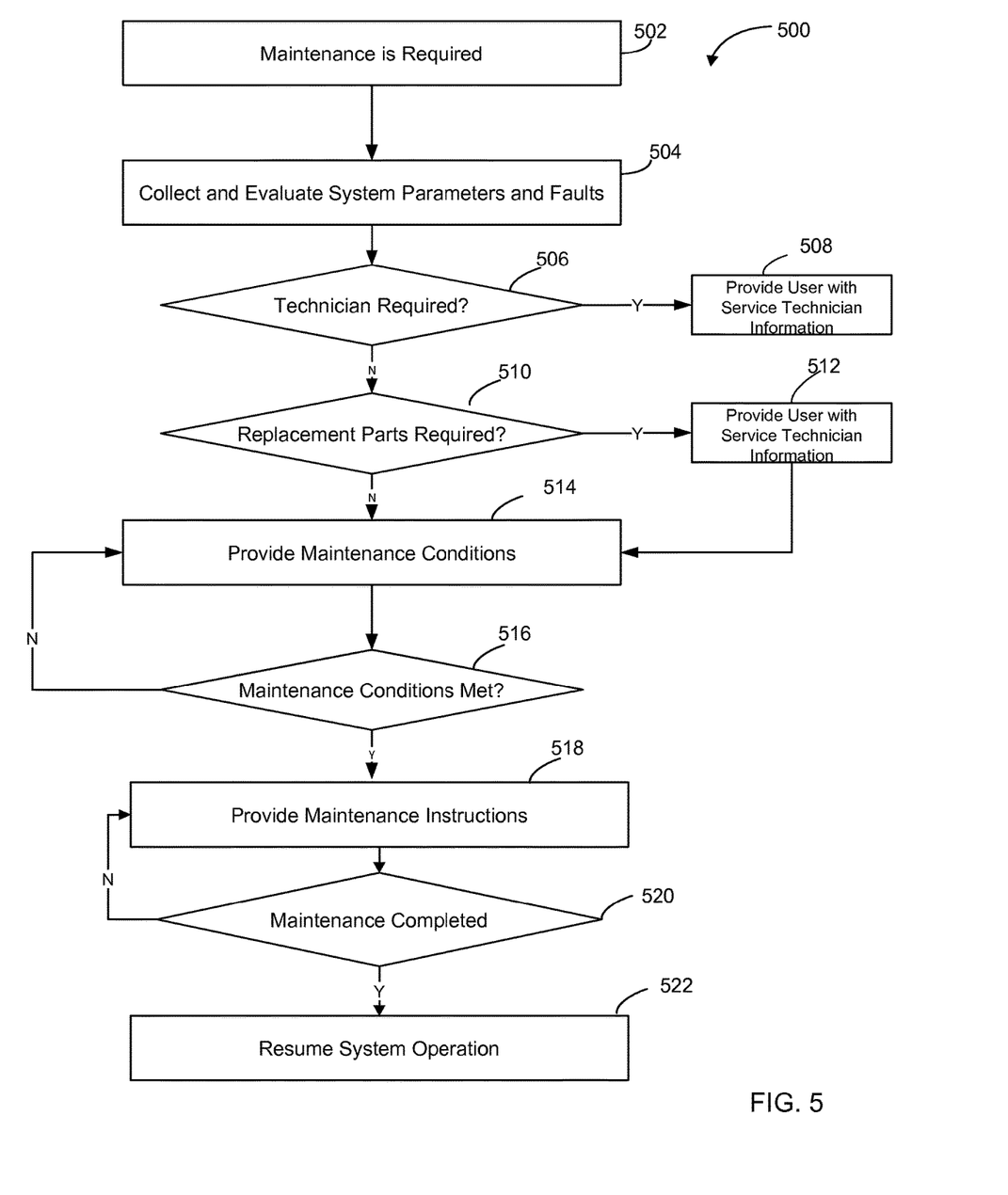
FIG. 5 is a flowchart of a process for providing corrective maintenance instructions to a user, according to some embodiments.

Turning now to FIG. 5, a process 500 for providing corrective maintenance instructions to a user is shown, according to some embodiments. The process 500 may be performed by the system 200, and specifically the corrective maintenance module 248 described in FIG. 2B, above. The process 500 may also be performed by the maintenance service 210. Further, in some embodiments, the process 500 may be performed by a combination of the maintenance service 210 and the corrective maintenance module 248. At process block 502 the system determines that corrective maintenance is required. In some embodiments, the user may provide an indication that corrective maintenance is needed via the user interface 216. In other embodiments, the system 200 may determine that corrective maintenance is required based on monitoring and analyzing one or more system parameters. System parameters may include system temperatures, system pressures, fluid or air flow rates, currents, voltages, etc. In one embodiment, the controller 204 may collect and analyze the system parameters. In other embodiments, the controller 204 may communicate the system parameters to the maintenance service 210 or the corrective maintenance module 248 for analysis and determination that corrective maintenance is required.

Once it is determined that corrective maintenance is required at process block 502, system parameters and potential faults are collected and evaluated at process block 504 to determine what type of corrective maintenance is required. In one embodiment, the controller 204 may collect the system parameters and faults, and communicate the information to the maintenance service 210 and/or the corrective maintenance module 248. Upon receiving the system parameters and faults, the maintenance service 210 and/or the corrective maintenance module 248 may analyze the data to determine what type of corrective maintenance is required. At process block 506, the system 200 determines if a technician is required to perform the corrective maintenance. In one embodiment, the maintenance service 210 and/or corrective maintenance module 248 determines that a technician is required based on the analyzed system parameters and faults. Further, in some embodiments, the user may indicate that a technician should be used to complete the corrective maintenance. For example, if the user is not confident or able to perform the corrective maintenance, they may provide an indication to the system 200, such as via user interface 216, that a technician is required or requested.

If a technician is determined to be required at process block 506, the user is provided with service technician information at process block 508. For example, the user may be provided with a number of authorized technicians in proximity to the user. In some embodiments, the list of service technicians are provided to the user via the user interface. In some embodiments, the user is further presented with contact information for the service technicians. The user may also be provided an option to directly contact one or more of the service technicians. For example, the user may be able to contact the service technicians via e-mail, phone, or a direct communication protocol. In some embodiments, the system 200 may provide the required corrective maintenance, and collected parameters and faults to the technician upon the user selecting to contact one or more technicians. If the user contacts the service technician via a voice call, the user may be provided with a maintenance identification number, which can be provided to the service technician. The service technician may then communicate with the maintenance service 210 and obtain the required information based on the received maintenance identification number.

If a technician is not required, the system 200 determines if replacement parts may be required at process block 510. In some embodiments, the maintenance service 210 may evaluate the system parameters and faults to determine the corrective maintenance required to correct the issue, and whether replacement parts are required to do so. In other embodiments, the corrective maintenance module 248 may analyze the system parameters and faults to determine the corrective maintenance required to correct the issue, and whether replacement parts are required to do so. If replacement parts are determined to be required, a parts list is provided to the user at process block 512. For example, the parts list may be provided to the user on the user interface 216. The parts list may include a list of parts and their associated part numbers. In some embodiments, the parts list may be displayed to the user along with an option to order the required replacement parts. For example, if the user chooses to order the parts, an order may be placed to an authorized dealer for pickup or delivery to the user. In other embodiments, the user may be provided with a list of options for where to order the replacement parts, allowing the user to compare prices and/or delivery rates between multiple dealers.

If replacement parts are not required, or if the required replacement parts have been obtained by the user, the user is provided with a list of maintenance conditions at process block 514. The maintenance conditions may be specific system conditions that must be satisfied before the system 200 will provide corrective maintenance instructions to the user. Example conditions may include removing power from one or more components within the HVAC equipment, valve or actuator positions, system modes, safety interlocks, and the like. At process block 516, the system 200 determines if the maintenance conditions are met. In one embodiment, the controller 204 may monitor the HVAC equipment to determine if the maintenance conditions are satisfied, and can communicate the status of the maintenance conditions to the maintenance service 210 and/or the corrective maintenance module 248 on the user device 214. If the maintenance conditions are not satisfied, the system 200 continues to provide the required maintenance conditions to the user at process block 514.

If the conditions are determined to be satisfied, the corrective maintenance instructions are provided to the user at process block 518. The corrective maintenance instructions may be step-by-step instructions to the user to perform the required corrective maintenance operation. In one embodiment, the corrective maintenance instructions may include a video tutorial. The video tutorial may be displayed to the user using the user interface 216. At process block 520, the system determines if the corrective maintenance is completed. For example, the system 200 may evaluate which instructions have been performed to determine if the corrective maintenance has been completed. In some embodiments, the controller 204 may analyze the maintenance process in combination with the maintenance service 210 and/or the corrective maintenance module 248. If the corrective maintenance is not completed, the system will continue to provide corrective maintenance instructions at process block 518. If the corrective maintenance is determined to be completed, the HVAC system operations are resumed at process block 522. In some embodiments, after the system operations are resumed, the system 200 may perform a diagnostics on the HVAC equipment to verify that the corrective maintenance was successful.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for a heating, ventilating, and air conditioning (HVAC) system, the control system comprising:

a user interface configured to present information to a user and receive inputs from the user;
a controller for controlling one or more HVAC system components and in communication with the user interface; and
a processing circuit in communication with the controller, the processing circuit comprising a processor and a memory, the memory storing instructions that are executable by the processor to cause the processor to:
receive one or more system parameters associated with the one or more HVAC system components;
determine if a maintenance operation is required in response to receiving the one or more system parameters, the one or more system parameters indicating a system fault;
display to the user via the user interface an indication that the maintenance operation is required;
receive an instruction from the user to initiate the maintenance operation;
display a sequence of maintenance instructions to the user, the sequence of the maintenance instructions prompting the user to perform a plurality of actions on the one or more HVAC system components in a particular order; and
receive one or more additional system parameters associated with the one or more HVAC system components and determine whether the plurality of actions performed by the user resolve the system fault based on the one or more additional system parameters.

2. The control system of claim 1, wherein the user interface is configured to receive an input from the user to initiate the maintenance operation.

3. The control system of claim 1, further comprising a maintenance service in communication with the user interface and the controller, wherein the maintenance service is configured to determine a type of maintenance operation required based on the one or more system parameters.

4. The control system of claim 3, wherein the maintenance service is further configured to store a plurality of data related to the HVAC system.

5. The control system of claim 4, wherein the plurality of data comprises one or more of system configuration data, HVAC component data, system installation data, system layout data, and system settings data.

6. The control system of claim 1, wherein the maintenance operation is one of a preventative maintenance operation and a corrective maintenance operation.

7. The control system of claim 1, wherein the user interface is configured to display a list of required replacement HVAC components based on the maintenance operation.

8. The control system of claim 7, wherein the user interface is further configured to provide an option to the user to purchase the required replacement HVAC components via the user interface.

9. The control system of claim 7, wherein the user interface is configured to display a list of one or more authorized technicians to the user based on the maintenance operation.

10. A computer implemented method for providing maintenance instructions for a heating, ventilating and air conditioning (HVAC) system to a user, comprising:
receiving a first indication that maintenance is required at a maintenance service, the first indication indicating a system fault;
displaying a second indication to the user via a user interface that the maintenance is required;
evaluating one or more system parameters at the maintenance service to determine one or more maintenance operations;
displaying a sequence of maintenance instructions to the user on the user interface, the sequence of the maintenance instructions prompting the user to perform a plurality of actions on the HVAC system; and
receiving one or more additional system parameters at the maintenance service and determining at the maintenance service whether the plurality of actions performed by the user resolve the system fault based on the one or more additional system parameters.

11. The method of claim 10, further comprising determining that a technician is required to perform the one or more maintenance operations.

12. The method of claim 11, further comprising displaying a list of authorized technicians to the user via the user interface in response to determining that the technician is required to perform the one or more maintenance operations.

13. The method of claim 10, wherein the maintenance service is a subscription based service provided to the user.

14. The method of claim 10, wherein the maintenance service comprises a plurality of system data associated with the HVAC system.

15. The method of claim 14, wherein the plurality of system data associated with the HVAC system comprises one or more of system configuration data, HVAC component data, system installation data, system layout data, and system settings data.

16. The method of claim 10, wherein the method further comprises displaying one or more preparation instructions on the user interface, wherein the one or more preparation instructions instruct the user to perform one or more of removing power from one or more HVAC devices in the HVAC system, actuating one or more valves within the HVAC system, and setting the HVAC system in one or more predetermined modes.

17. The method of claim 10, wherein the one or more maintenance operations are one of one or more preventative maintenance operations and one or more corrective maintenance operations.

18. A control system for a heating, ventilating, and air conditioning (HVAC) system, the control system comprising:
a user interface configured to present information to a user and receive inputs from the user, the user interface in communication with a digital imaging device;
a controller for controlling one or more HVAC system components and in communication with the user interface; and
a processing circuit in communication with the controller, the processing circuit comprising a processor and a memory, the memory storing instructions that are executable by the processor to cause the processor to:
receive one or more system parameters associated with the one or more HVAC system components;
determine if a maintenance operation is required in response to receiving the one or more system parameters, the one or more system parameters indicating a system fault;
display to the user, using the user interface, an indication that the maintenance operation is required;
image the one or more HVAC system components using the digital imaging device, and display the image using the user interface;
display a sequence of maintenance instructions on the user interface, wherein the sequence of the maintenance instructions are overlaid onto the image of the one or more HVAC system components, the sequence of the maintenance instructions prompting the user to perform a plurality of actions on the one or more HVAC system components in a particular order; and receive one or more additional system parameters associated with the one or more HVAC system components and determine whether the plurality of actions performed by the user resolve the system fault based on the one or more additional system parameters.

19. The control system of claim 18, wherein the processor is further configured to indicate in the image of the one or more HVAC system components one or more specific HVAC system components associated with the maintenance instructions.

20. The control system of claim 18, further comprising a maintenance service in communication with the user interface.

21. The control system of claim 20, wherein the maintenance service is configured to display a location of the one or more HVAC system components associated with the maintenance instructions using the user interface.

22. The control system of claim 20, wherein the maintenance service comprises one or more of system configuration data, HVAC component data, system installation data, system layout data, and system settings data associated with the HVAC system.

23. The control system of claim 1, wherein the sequence of maintenance instructions comprise a list of a plurality of individual instructions, each of the plurality of individual instructions associated with a step number of a plurality of step numbers.

24. The control system of claim 23, wherein the one or more system HVAC components are a plurality of HVAC system components, wherein each of the plurality of individual instructions instruct the user to service one of the plurality of HVAC system components.

25. The control system of claim 23, wherein the sequence of maintenance instructions comprise a particular instructions to perform a second individual instruction of the plurality of individual instructions if performing a first individual instruction of the plurality of individual instructions failed to resolve the system fault.

* * * * *